United States Patent
Hahn

(10) Patent No.: US 6,923,491 B2
(45) Date of Patent: Aug. 2, 2005

(54) VEHICLE ROOF WHICH IS MOVABLE BETWEEN A CLOSED POSITION AND A STORAGE POSITION

(75) Inventor: Gerald Hahn, Wistedt (DE)

(73) Assignee: CTS Fahrzeug-Dachsysteme GmbH, Hamburg (DE)

(*) Notice: Subject to any disclaimer, the term of this patent is extended or adjusted under 35 U.S.C. 154(b) by 0 days.

(21) Appl. No.: 10/805,659

(22) Filed: Mar. 20, 2004

(65) Prior Publication Data
US 2004/0178656 A1 Sep. 16, 2004

Related U.S. Application Data

(63) Continuation-in-part of application No. PCT/EP03/03157, filed on Mar. 27, 2003.

(30) Foreign Application Priority Data

Apr. 12, 2002 (DE) .......................................... 102 16 417

(51) Int. Cl.⁷ .................................................. B60J 7/00
(52) U.S. Cl. ............. 296/107.08; 296/108; 296/107.17
(58) Field of Search ............................. 296/107.08, 76, 296/108, 107.07, 120.1, 124, 128, 107.09, 107.17, 121, 37.1, 136.06, 146.14, 223

(56) References Cited

U.S. PATENT DOCUMENTS

| | | | |
|---|---|---|---|
| 2,782,070 A | | 2/1957 | Chaban |
| 5,746,470 A | * | 5/1998 | Seel et al. .................. 296/108 |
| 5,775,766 A | * | 7/1998 | Schaible et al. ....... 296/107.09 |
| 5,823,606 A | * | 10/1998 | Schenk et al. ......... 296/107.08 |
| 5,975,619 A | * | 11/1999 | Dettling et al. ........ 296/107.08 |
| 6,131,988 A | * | 10/2000 | Queveau et al. ....... 296/107.17 |
| 6,186,577 B1 | * | 2/2001 | Guckel et al. ......... 296/107.08 |
| 6,193,300 B1 | * | 2/2001 | Nakatomi et al. ..... 296/107.08 |
| 6,299,234 B1 | * | 10/2001 | Seel et al. ............. 296/107.17 |
| 6,325,445 B1 | * | 12/2001 | Schenk .................... 296/107.08 |
| 6,511,118 B2 | * | 1/2003 | Liedmeyer et al. .... 296/107.08 |
| 6,595,572 B2 | * | 7/2003 | Schuler et al. ......... 296/107.08 |
| 6,604,775 B2 | * | 8/2003 | Obendiek .............. 296/107.08 |
| 6,659,534 B2 | * | 12/2003 | Willard .................. 296/107.08 |
| 6,729,672 B2 | * | 5/2004 | Neubrand .............. 296/107.07 |
| 6,764,128 B2 | * | 7/2004 | Halbweiss et al. .......... 296/108 |
| 6,857,686 B2 | * | 2/2005 | Willard .................. 296/107.08 |
| 6,866,327 B2 | * | 3/2005 | Willard .................. 296/107.08 |
| 2004/0164586 A1 | * | 8/2004 | Tezuka ...................... 296/108 |
| 2004/0222659 A1 | * | 11/2004 | Hesse .................... 296/107.17 |

FOREIGN PATENT DOCUMENTS

| | | |
|---|---|---|
| DE | 197 06 444 | 6/1998 |
| DE | 298 12 103 | 12/1999 |
| DE | 199 60 010 | 5/2001 |
| EP | 1 108 581 | 6/2001 |
| EP | 1 279 541 | 1/2003 |

\* cited by examiner

Primary Examiner—Kiran B. Patel
(74) Attorney, Agent, or Firm—Klaus J. Bach

(57) ABSTRACT

In a vehicle roof which is movable between a closed position and a storage position in a rear storage compartment of a vehicle comprising a rear cover which is pivotally supported such that it can be raised at the rear end thereof from a closed position, in which it covers the storage compartment, to a loading position, in which the rear end of the rear cover is raised, the vehicle roof stored in the rear storage compartment can be raised independently of the rear cover and can be locked with the rear cover in the raised position, in which access to the rear trunk is facilitated.

11 Claims, 3 Drawing Sheets

VEHICLE ROOF WHICH IS MOVABLE BETWEEN A CLOSED POSITION AND A STORAGE POSITION

This is a Continuation-In-Part Application of international application PCT/EP03/03157 filed Mar. 27, 2003 and claiming the priority of German application 102 16 417.7 filed Apr. 12, 2002.

BACKGROUND OF THE INVENTION

The invention relates to a vehicle roof which is movable between a closed position, in which it covers an interior vehicle space, and an open position, in which the roof is deposited in a storage compartment behind the interior of the vehicle space, and which is closed by a rear lid which can be raised at its rear end for loading and unloading the trunk of the vehicle whereby the roof stored within can also be raised to facilitate the loading and unloading of the trunk.

DE 197 06 444 C1 discloses a two part hardtop vehicle roof with front and rear rigid roof parts, which can be moved between a closed position, in which they cover an interior vehicle space, and a storage position, in which the two roof parts are disposed in a rear storage compartment. The storage compartment for accommodating the roof parts forms a part of the trunk of the vehicle which is closed by a trunk lid. For loading the trunk, the rear of the trunk lid is raised. The roof packet deposited in the trunk is coupled to the underside of the trunk lid and is raised together with the trunk lid such that the passage between the rear edge of the trunk lid and the rear of the vehicle is increased and the loading or unloading of the trunk is facilitated.

However, the roof part packet at the underside of the trunk lid has a substantial weight which must be pivoted together with the rear trunk lid by a drive mechanism. The drive mechanism must be dimensioned sufficiently large so that it is capable of providing the forces needed for opening and also for closing of the trunk lid including the roof part packet connected thereto. Because of the large weight, a drive mechanism is necessary.

Also, DE 199 60 010 C1 discloses a two-part hardtop vehicle roof, whose roof parts form in the storage position a packet of superimposed roof parts which, for loading the trunk, can be pivoted in the storage compartment into a raised auxiliary position, in which the roof parts are disposed about parallel to the pivoted-open trunk lid. The trunk lid is pivotable about an axis which extends near the vehicle interior and the roof parts are connected to the vehicle body by way of an operating linkage which is operable by hydraulic actuating elements. The movement of the roof parts for reaching the raised auxiliary loading position is uncoupled from the movement of the trunk lid. Accordingly, the raising and closing movements of the trunk lid and the roof part packet during opening and closing of the trunk lid must be manually or electronically adjusted to each other in order to avoid collisions and unacceptably high forces.

It is the object of the present invention to provide a removable vehicle roof, which is stored in its open position in a rear storage compartment in such a way that, also in the storage position of the roof in the rear storage compartment, the loading and unloading of the rear trunk lid of the vehicle is facilitated.

SUMMARY OF THE INVENTION

In a vehicle roof which is movable between a closed position and a storage position in a rear storage compartment of a vehicle provided with a rear cover which is pivotally supported such that it can be raised at the rear end thereof from a closed position, in which it covers the storage compartment, and a loading position, in which the rear end of the rear cover is raised, the vehicle roof stored in the rear storage compartment can be raised independently of the rear cover and can be locked with the rear cover in the raised position, in which access to the rear trunk is facilitated.

With the locking of the rear cover or trunk lid in an open position for loading and unloading the trunk, it is ensured that the interlocked trunk lid and vehicle roof are not unintentionally closed and that an opening mechanism or opening support structure is not subjected to the weight of the trunk lid and the vehicle roof. The vehicle roof can be uncoupled by releasing the locking means and they can be raised independently of each other into the loading position in which loading of the vehicle trunk is facilitated. In the raised position however, the trunk lid and the vehicle roof parts can be locked by the locking means. This has the advantage that, for opening the trunk lid whose weight is substantially less than that of the vehicle roof, a simple passive force element such as a gas pressure spring or a small drive is sufficient. The vehicle roof can be raised by the roof operating mechanism which is provided for the transfer of the roof between the closed and the storage positions. By locking the vehicle roof in the raised position, it is furthermore ensured that the vehicle roof is not raised beyond the loading position and is not pressed against the raised, open trunk lid.

In an expedient embodiment, the locking means is automatically moved to the locking position when the vehicle roof is raised during the transfer from the storage position to the trunk loading position. The locking position is reached automatically then the vehicle roof is raised from its storage position while the rear trunk lid is open. An additional operating mechanism for initiating the locking is not necessary. Vice versa, the locking mechanism is automatically released when the vehicle roof is lowered from the trunk loading position to the storage position.

In an advantageous embodiment, the locking mechanism is connected to a component of the roof operating mechanism, particularly to a roof mechanism operating arm which is pivotally supported on the vehicle body. By raising the roof packet in the storage compartment, particularly by the pivot movement of the operating arm, the locking mechanism is automatically transferred to a locking position or, upon returning the roof packet to its storage position, the locking mechanism is automatically released.

In the locking position, relative movement of the roof part packet and the trunk lid is blocked by a locking pawl which is preferably mounted to the vehicle roof and, in the locking position, engages a locking pin or similar member on a component of the trunk lid. Particularly for the case, wherein, for reaching the loading position, the trunk lid and the roof parts must be pivoted each about a vehicle body based pivot axis and these two pivot axes are spaced from each other, it is possible by relatively simple design features to provide for a blocking of the relative pivot movements of the trunk lid and the roof parts about their respective pivot axes.

Then no additional support of the locking structure on the vehicle body is required.

The invention will be described below in greater detail on the basis of the accompanying drawings.

DETAILED DESCRIPTION OF A PARTICULAR EMBODIMENT

Figure 1:
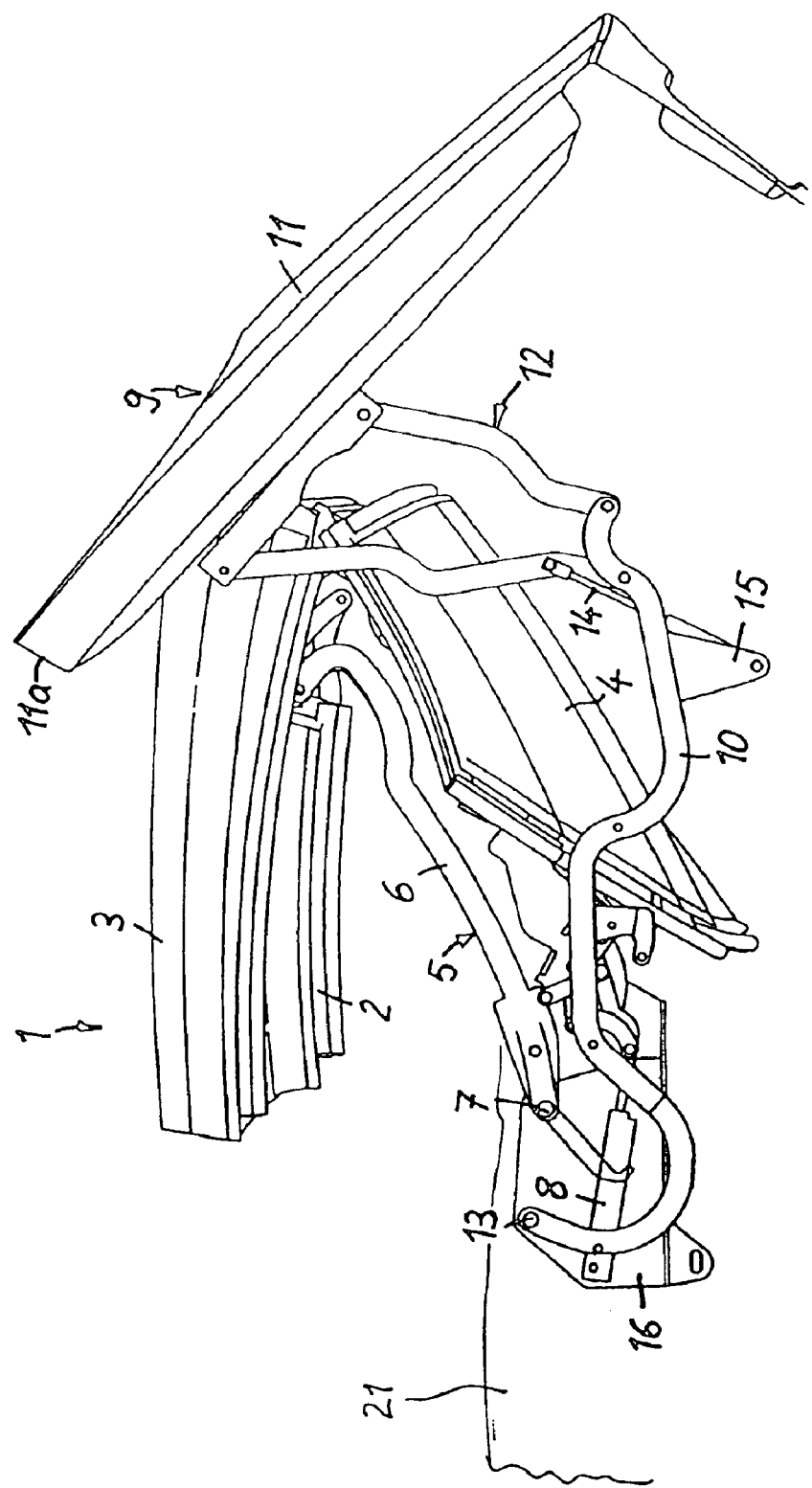
FIG. 1 is a side view of a multipart hardtop vehicle roof in an intermediate position during the transfer between a closed position and a storage position, wherein the rear cover is raised at its front end to facilitate the transfer movement.

In the figures, identical parts are designated by the same reference numerals.

The vehicle roof 1 shown in FIG. 1 is a hardtop vehicle roof, which comprises three rigid roof parts 2, 3, and 4. In the position as shown in FIG. 1, the vehicle roof is in an intermediate position between a closed position in which it covers an interior vehicle space and a storage position in which it is disposed in a rear storage compartment. For placement into the storage compartment, the roof parts 2, 3 and 4 are placed on top of one another whereby a stacked roof part packet is formed, in which the rear roof part 4 is disposed at the bottom, the front roof part 2 is disposed in the middle and the intermediate roof part 3 is disposed on top. The vehicle roof 1 is supported on the vehicle body 21 by means of a roof operating mechanism 5 and is moved between the closed and the storage positions by an operating mechanism 8, which is also mounted on the vehicle body. The roof operating mechanism 5 comprises a main support arm 6, which is pivotally supported on the vehicle body by a pivot joint 7.

Furthermore a rear cover 9 is provided which covers the trunk of the vehicle and also the storage compartment for the vehicle roof. The cover 9 comprises a tubular frame 10, which is supported by the vehicle body so as to be pivotable about a pivot axis 13, which is disposed adjacent the vehicle interior and a trunk lid 11, which is supported by the tubular frame 10 by a lid operating mechanism 12. The lid operating mechanism 12 is in the form of a four-link arrangement which provides for a combination translatory and rotating raising movement of the lid 11 relative to the tubular support frame 10. For opening and closing the vehicle roof 1, the tubular frame 10 remains in its rest position on the vehicle body. The lid 11 is opened by operating the cover operating mechanism 12 in such a way that the front end 11a of the lid is raised whereby a passage for the vehicle roof is provided.

The operating mechanism 12 for the rear cover 9 is actuated by means of an operating element 14 which is supported on the tubular frame 10 by a support member 15. The tubular frame 10 is supported in its rest position on the vehicle body by the support member 15. The roof operating mechanism 5 as well as the tubular frame 10 are supported by a console 16, which is mounted on the vehicle body 21.

Figure 2:
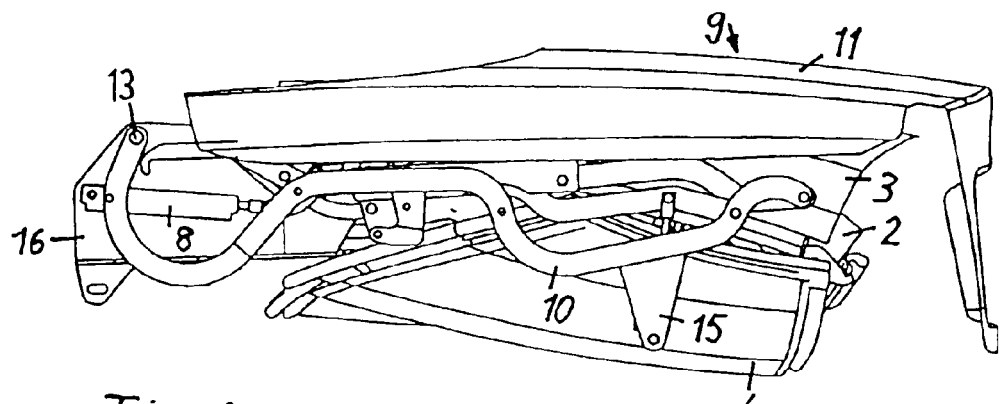
FIG. 2 shows the vehicle roof deposited in the rear storage compartment with the cover closed.

FIG. 2 shows the vehicle roof in its storage position. The rear cover 9 is in the closed position in which the tubular frame 10, which is supported by the vehicle body so as to be pivotable about pivot axis 13, as well as trunk lid 11 are in the closed rest position.

Figure 3:
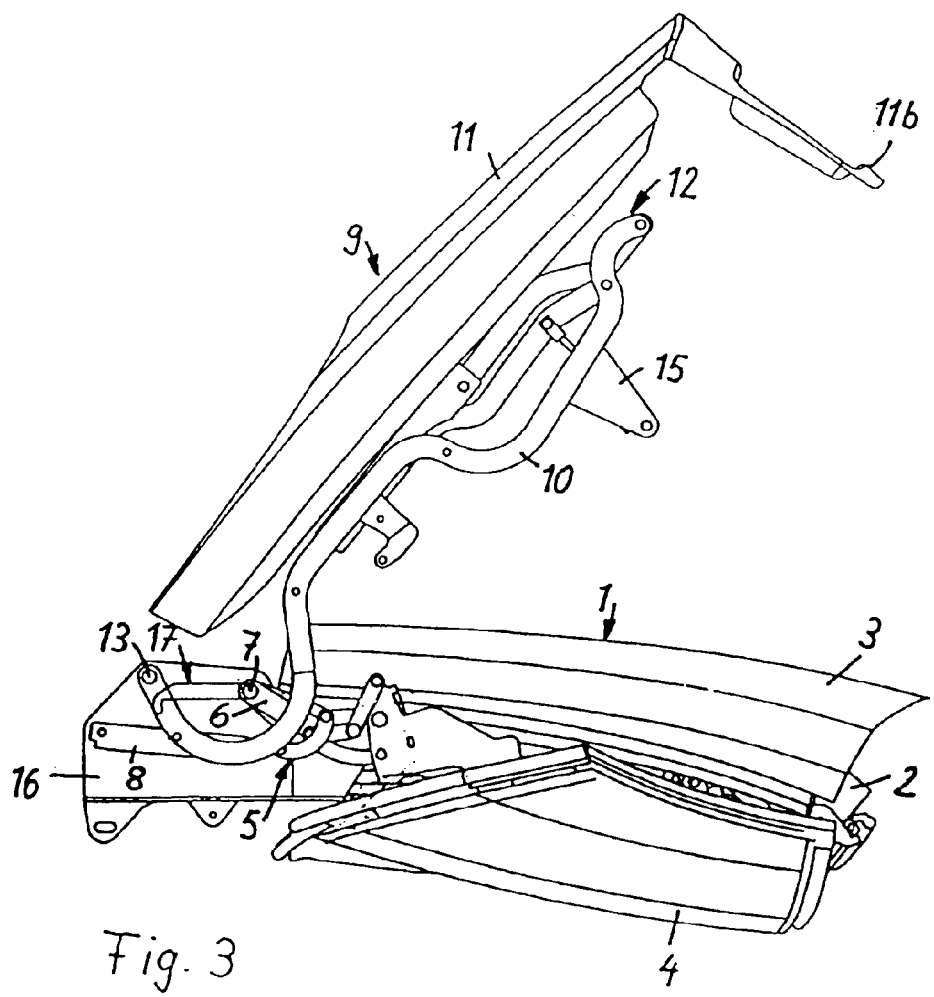
FIG. 3 shows the cover or trunk lid raised at its rear end into a loading position to provide access to the trunk space, however, the vehicle roof is shown still in the storage position in the storage compartment.

FIG. 3 shows the trunk lid 11 of the rear cover 9 raised at its rear end 11b for loading or unloading the trunk. The vehicle roof 1 with the roof parts 2, 3 and 4, however is still in its storage position. For raising the rear end 11b of the trunk lid 11, the complete rear cover 9 including the tubular frame 10 and the cover operating mechanism is pivoted open about the pivot axis 13. To this end, an additional force member such as a gas strut may be provided for supporting the raising movement. Furthermore, a locking structure 17 is provided which, in the raised loading position of the trunk lid 11 and the vehicle roof 11, interlocks these two components in such a way that the raised trunk lid 11 cannot be closed and the partially raised vehicle roof cannot be raised any further. The locking structure 17 is shown in detail in FIG. 4.

Figure 4:
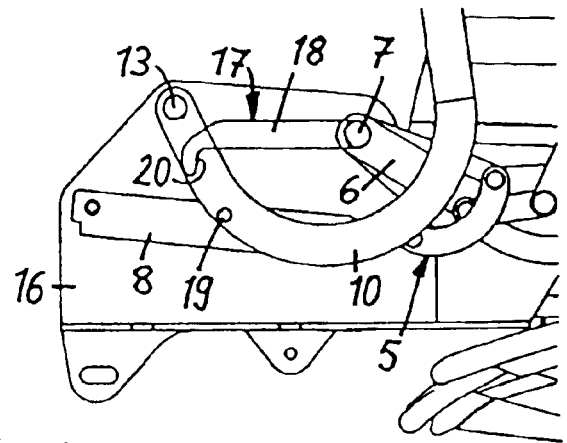
FIG. 4 shows an enlarged section of the operating mechanism by which the cover and the vehicle roof are supported on the vehicle body in a position corresponding to that shown in FIG. 3.

The locking structure 17 as shown in FIG. 4 comprises a locking pawl 18, which is firmly connected to the main roof support arm 6 and which can pivot together with the main roof support arm 6 about the vehicle body based pivot joint 7. The locking structure 17 further comprises a locking bolt 19, which is firmly mounted to the tubular frame 10 of the rear cover 9 at a distance from the vehicle body based pivot axis 13 of the tubular frame 10. The locking pawl 18 is provided at its end remote from the main support arm 6 with a locking hook 20, which, in the locking position as shown in FIG. 5, engages the locking bolt 19 on the tubular frame 10 in a form-fitting manner.

Figure 5:
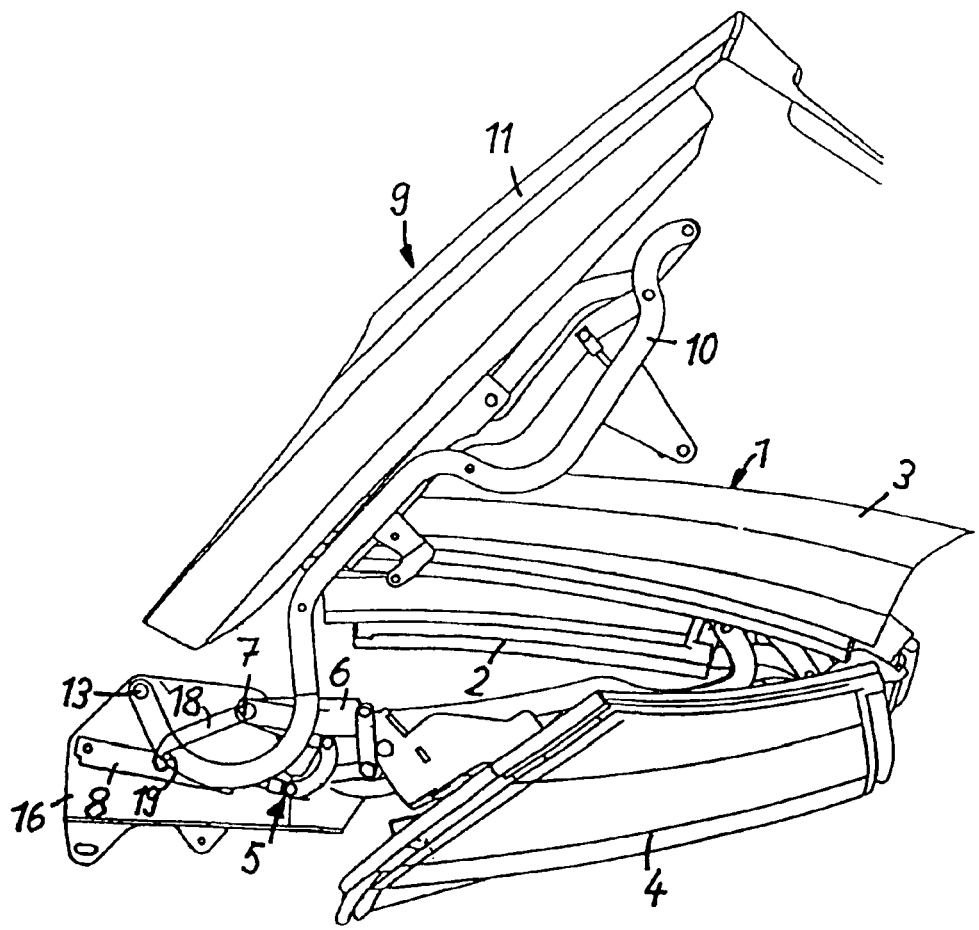
FIG. 5 shows the cover in a position as shown in FIG. 3 wherein however also the vehicle roof parts are in a raised trunk loading position.

The trunk lid 11 can be pivoted into the raised loading position as shown in FIGS. 3 and 5 without being prevented therefrom by the locking structure 17. The vehicle roof 1 is raised by actuating the operating mechanism 8 to the raised loading position in which loading of the trunk is facilitated after the trunk lid 11 has been pivoted open as shown in FIG. 5. Then the main support arm 6 of the roof operating mechanism 5 of the vehicle roof as well as the locking pawl 18 are pivoted about the vehicle body-based pivot joint 7. The vehicle roof 1 can be pivoted in the opening direction about the pivot joint 7 until the locking pawl 18 engages the locking bolt 19 on the tubular frame 10, whereby further pivot movement of the main support arm 6 and the locking pawl 18 is prevented. In this position, the vehicle roof is in a position in which loading of the trunk is facilitated. Because of the form-locking engagement of the locking bolt 19 by the locking pawl 18 a return movement of the trunk lid 9 about the vehicle body-based pivot axis 13 of the tubular frame 10 toward the storage position is prevented as the rear cover 9 and the vehicle roof 1 are now interlocked. In this locked position, the rear cover 9 cannot be closed and the vehicle roof 1 cannot be raised beyond the loading position thereof.

For closing the rear cover 9, first, the vehicle roof 1 must be lowered to its storage position whereby the locking pawl 18 is disengaged from the locking bolt 19 and the tubular frame 10 is released that is it is no longer retained by the locking structure. The rear cover 9 can then be pivoted back to its closed rest position.

Instead of a hardtop as described herein, the vehicle roof may include a soft-top or ragtop which is supported by a roof support linkage.

What is claimed is:

1. A vehicle roof which is movable between a closed position and a storage position in a rear storage compartment of a vehicle having a rear cover (9) pivotally supported such that it can be raised at the rear end thereof from a closed position, in which it cover said storage compartment, to an open position in which the rear end of the rear cover (9) is raised and in which also the vehicle roof in said rear storage compartment can be raised to facilitate access to the rear storage compartment, and a locking structure (17) which, with the rear end (11b) of the rear cover (9) raised to the open position thereof, prevents further raising of the vehicle roof (1) beyond said raised loading position and also a closing of the rear cover (9), while the roof (1) is in the loading position.

2. A vehicle roof according to claim 1, wherein said locking structure (17) is transferable to a locking position by the raising of the vehicle roof (1) from its storage position in said rear storage compartment.

3. A vehicle roof according to claim 1, wherein said locking structure (17) is transferable to a release position by lowering the vehicle roof (1) to its storage position in said rear storage compartment.

4. A vehicle roof according to claim 1, wherein said locking structure (17) include a locking pawl (18) which is firmly connected to a main support arm (6) of an operating mechanism (5) of said roof (1).

5. A vehicle roof according to claim 4, wherein in said raised locking position a tubular frame (10) supporting said rear cover (9) and said main support arm (6) are interlocked.

6. A vehicle roof according to claim 4, wherein, in said locking position, said locking pawl (18) is joined to said tubular frame (10) and to the main support arm (6) of the vehicle roof (1).

7. A vehicle roof according to claim 6, wherein said locking pawl (18) is firmly connected to said main support arm (6) of said vehicle roof (1) and in said locking position engages a locking bolt (19) mounted to said rear cover (9).

8. A vehicle roof according to claim 1, wherein said rear cover (9) is supported so as to be pivotable about a vehicle body based pivot axis (13) disposed in front of the rear cover (9).

9. A vehicle roof according to claim 8, wherein said main support arm (6) of said vehicle roof (1) is supported on said vehicle body (console 16) by a pivot joint (7) and the vehicle body based pivot axis (13) of the rear cover 9 and the axis of said pivot joint (7) supporting said main support arm (6) are spaced from each other.

10. A vehicle roof according to claim 1, wherein said vehicle roof (1) is a hardtop vehicle roof comprising at least two roof parts (2, 3, 4).

11. A vehicle roof according to claim 1, wherein an operating element is provided for raising said vehicle roof out of said storage position thereof to a trunk loading position and also for moving said vehicle roof between the closed position and the storage position thereof.

* * * * *